Figure 1:
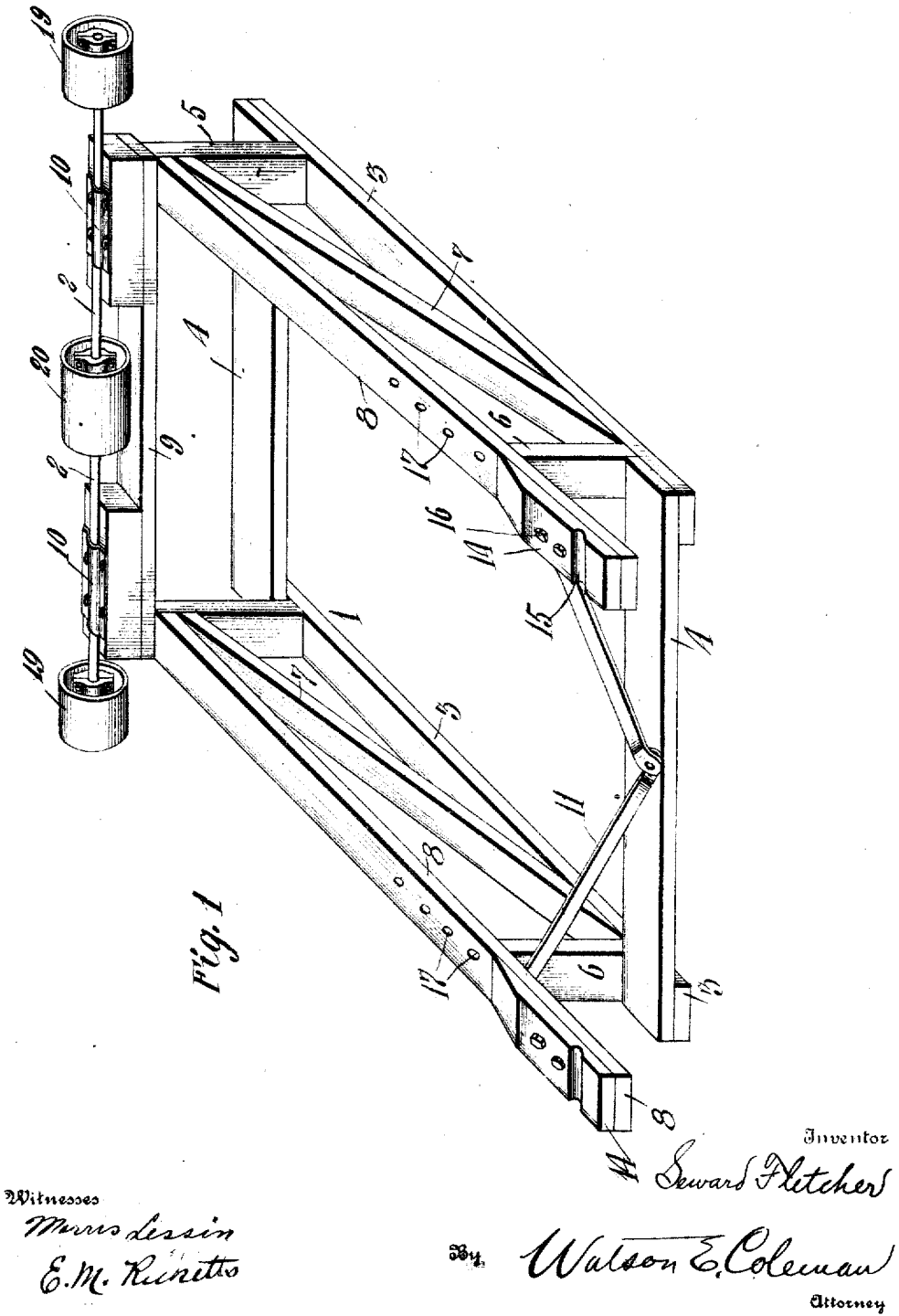

S. FLETCHER.
POWER TRANSMITTING DEVICE.
APPLICATION FILED MAR. 17, 1909.

933,068.

Patented Sept. 7, 1909.
2 SHEETS—SHEET 1.

Witnesses
Morris Lessin
E. M. Ricketts

Inventor
Seward Fletcher
By Watson E. Coleman
Attorney

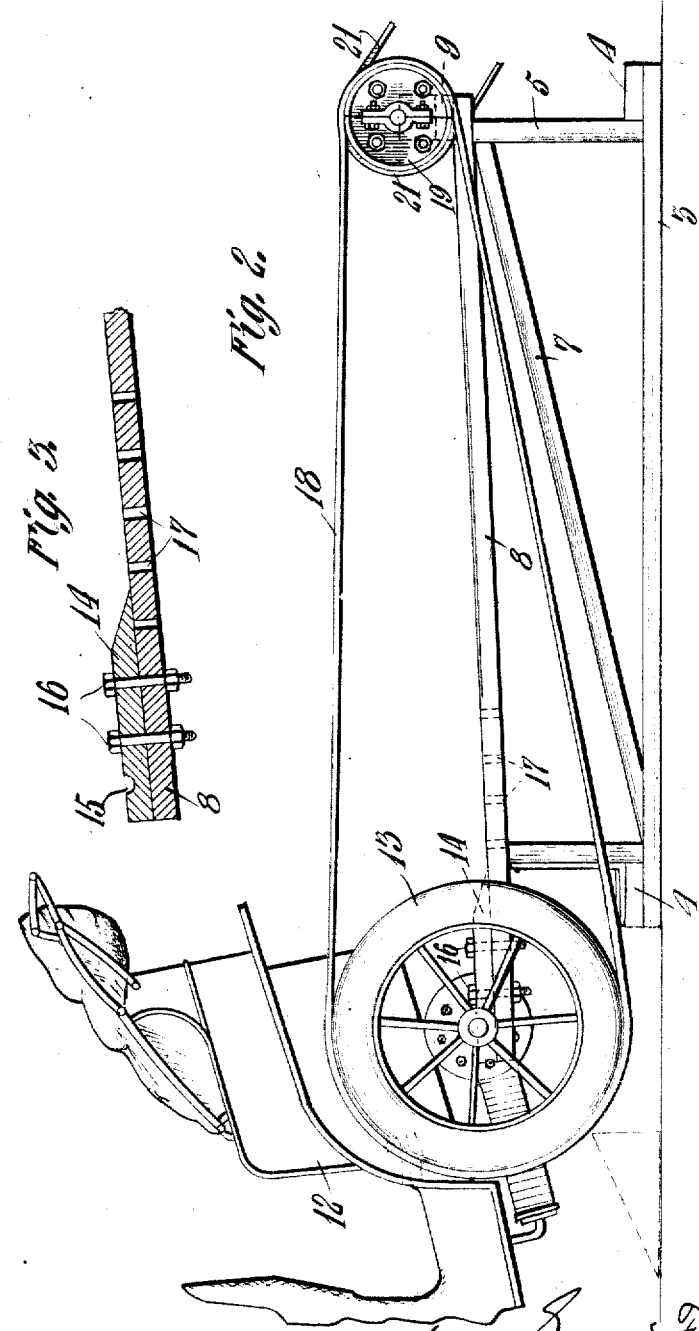

UNITED STATES PATENT OFFICE.

SEWARD FLETCHER, OF TRAVERSE CITY, MICHIGAN.

POWER-TRANSMITTING DEVICE.

933,068.  Specification of Letters Patent.  Patented Sept. 7, 1909.

Application filed March 17, 1909. Serial No. 484,009.

*To all whom it may concern:*

Be it known that I, SEWARD FLETCHER, a citizen of the United States, residing at Traverse City, in the county of Grand Traverse and State of Michigan, have invented certain new and useful Improvements in Power-Transmitting Devices, of which the following is a specification, reference being had to the accompanying drawings.

This invention relates to improvements in power transmitting devices and more particularly to a motor vehicle supporting device by means of which the motor of an automobile or other power propelled vehicle may be used for operating pumps, wood sawing machines, cream separators, fanning mills or grain separators, and various other machines.

The invention consists of a frame or support on which the rear portion of an automobile or the like may be supported so that its drive wheels will be out of contact with the ground, a drive shaft arranged on the frame or support and from which power may be transmitted to various kinds of machines or devices, and driving belts or other suitable driving connections between the drive shaft and the drive wheels of the automobile so that the power generated by the motor of the automobile may be transmitted to the drive shaft and from the latter to the machine or machines to be driven.

The invention further contemplates inclined supports for the automobile and longitudinally adjustable bearing blocks on said supports whereby the device may be adapted to accommodate automobiles of different sizes and also whereby the driving belts or connections between the drive wheels of the automobile and the drive shaft may be stretched.

The object of the invention is to provide a device of this character which will be simple and practical in construction so that it may be produced at a small cost and will be strong and durable.

With the above and other objects in view, the invention consists of the novel features of construction and the combination and arrangement of parts hereinafter fully described and claimed, and illustrated in the accompanying drawings, in which—

Figure 1 is a perspective view of the improved power transmitting device; Fig. 2 is a side elevation of the same showing an automobile in position thereon and having its driving wheels connected to the drive shaft; and Fig. 3 is a detail vertical longitudinal section through one of the inclined supports and its adjustable bearing block.

The preferred embodiment of the invention illustrated in the drawings comprises a support or frame 1 having at one end a horizontal transversely extending drive shaft 2 and at its other end suitable means for supporting an automobile or motor vehicle with its drive wheels elevated off of the ground or floor. While the frame or support 1 may be of any suitable form and construction, it preferably consists of longitudinal beams or sills 3 which may be secured or anchored to the ground or floor and which are connected by cross beams 4. Rising from the sills 3 are uprights 5, 6 connected by inclined or diagonal braces 7 and also by downwardly inclined beams or supports 8. The uprights 5 at one end of the frame are of greater height than the uprights 6 at the other end and said uprights 5 are connected by an upper cross bar 9 on which are arranged bearings 10 for the shaft 2. The shorter uprights 6 are further strengthened by inclined braces 11 arranged between their upper portions and the adjacent cross bar 4.

While any suitable means may be provided for holding the automobile 12 upon the frame or support 1 with its drive wheels 13 off of the ground, I preferably provide on the lower ends of the inclined supporting beams longitudinally adjustable supporting or bearing blocks 14 having transverse grooves 15 for the reception of the rear axle of the automobile. Said blocks 14 are retained in position by removable bolts 16 which pass through them and through longitudinal series of vertical openings 17 formed in the supporting beams or bars 8, as shown. The beams or supports 8 are downwardly inclined and the blocks 14 are adjustably mounted on said beams so that the device will be adapted to receive automobiles having drive wheels of great or small diameter.

While any suitable means may be provided for imparting the motion of the drive wheels 13 to the shaft 2, I preferably employ two endless belts 18 which pass around said wheels and also around pulleys or band wheels 19 fixed to the ends of the shaft 2.

By employing such drive belts, it will not be necessary to alter the construction of the automobile to permit the motion of its motor shaft to be imparted to the drive shaft 2 and said belts may be readily tightened or loosened by adjusting the bearing blocks 14 longitudinally on the inclined beams 8.

While any suitable means may be provided for imparting the motion of the shaft 2 to the machine or machines to be driven, I preferably provide on the center of the shaft 2 a pulley or belt wheels 20 which may be connected by a belt 21 to the shaft of the machine or device to be driven.

In operation, it will be seen that when the rear axle of the automobile or other power vehicle is placed in the grooves 15 of the blocks 14 the drive wheels 13 of the machine are supported off of the ground or floor and they may be readily connected by the belts 18 to the drive shaft 2, which latter may then be connected by the belt 21 or other means to the machine or machines to be driven. The use of the variable speed gearing or friction clutch of the automobile engine or motor enables the operator to effectively start or stop the shaft 2 and control its speed according to the nature of the machine being driven by the device. In order to place the rear axle of the automobile in the grooves 15 of the supporting or bearing blocks 14 without manually lifting the rear portion of the automobile, wedge-shaped blocks of suitable height may be placed in proper position, as indicated in dotted lines in Fig. 2, and the automobile may be backed up the inclined upper faces of said blocks so that as the wheels 13 leave such blocks the axle will lower into the grooves 15, as will be readily understood upon reference to Fig. 2. By providing the inclined beams or supports 8 and arranging the bearing blocks 14 so that they may be adjusted longitudinally on such supports, it will be seen that the device is adapted for use in connection with automobiles having drive wheels of different sizes.

While I have shown and described in detail the preferred embodiment of the invention, it will be understood that I do not wish to be limited to the precise construction set forth since various changes in the form, proportion, arrangement and details of construction may be resorted to without departing from the spirit and scope of the invention.

Having thus described the invention what is claimed is:

1. The combination of an inclined frame, side bearing blocks longitudinally adjustable on the frame and constructed to receive and support a motor vehicle with its driving wheels free, a shaft journaled on the frame and means on the shaft for receiving power from the vehicle driving wheel and transmitting the same.

2. The combination of a supporting frame having parallel upper side beams inclined downwardly and formed adjacent their lower ends with longitudinal series of openings, blocks longitudinally slidable on the upper faces of said inclined beams and formed with openings to register with the openings in said beams, said blocks being also formed with transverse grooves to receive the axle of a motor vehicle and support the latter with its driving wheels free, fastenings passed through the registering openings in said blocks and means to adjustably secure the former upon the latter, a transverse shaft journaled upon said frame and means on the shaft for receiving power from the vehicle driving wheel and transmitting the same.

In testimony whereof I hereunto affix my signature in the presence of two witnesses.

SEWARD FLETCHER.

Witnesses:
 SPRAGUE PRATT,
 H. C. DAVIS.